(No Model.) 5 Sheets—Sheet 1.

L. MAILLARD.
MACHINE FOR CUTTING DENTAL BURRS.

No. 364,832. Patented June 14, 1887.

Witnesses.
Robert Serrett
F. Morrison

Inventor.
Louis Maillard,
By W. Bruce
Atty.

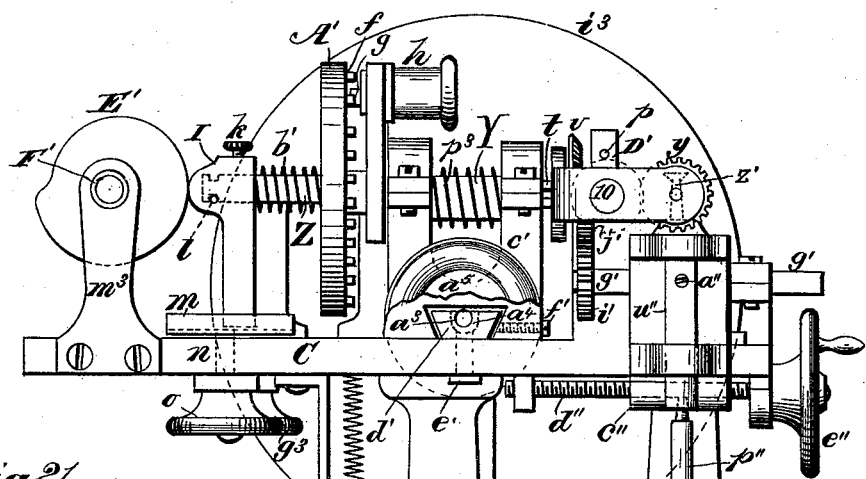
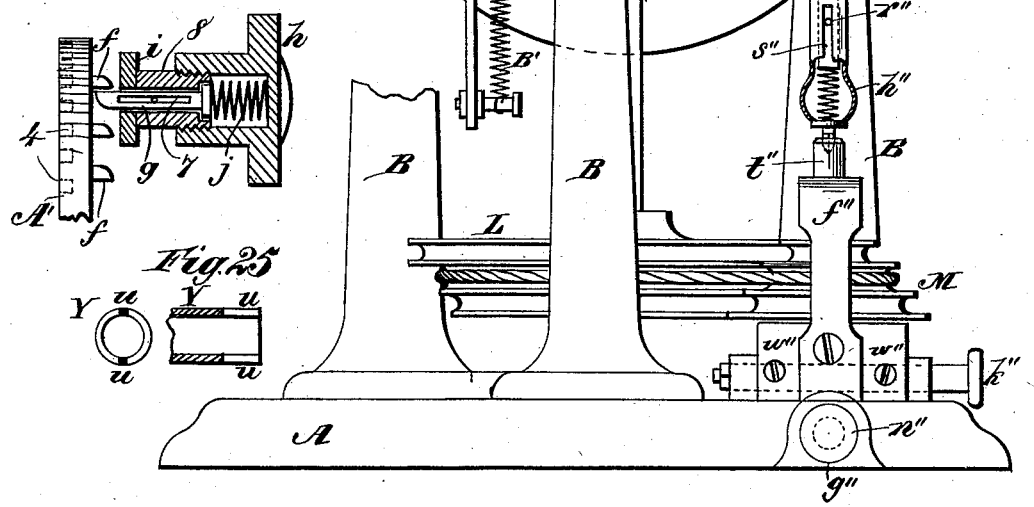

(No Model.) 5 Sheets—Sheet 3.
L. MAILLARD.
MACHINE FOR CUTTING DENTAL BURRS.
No. 364,832. Patented June 14, 1887.
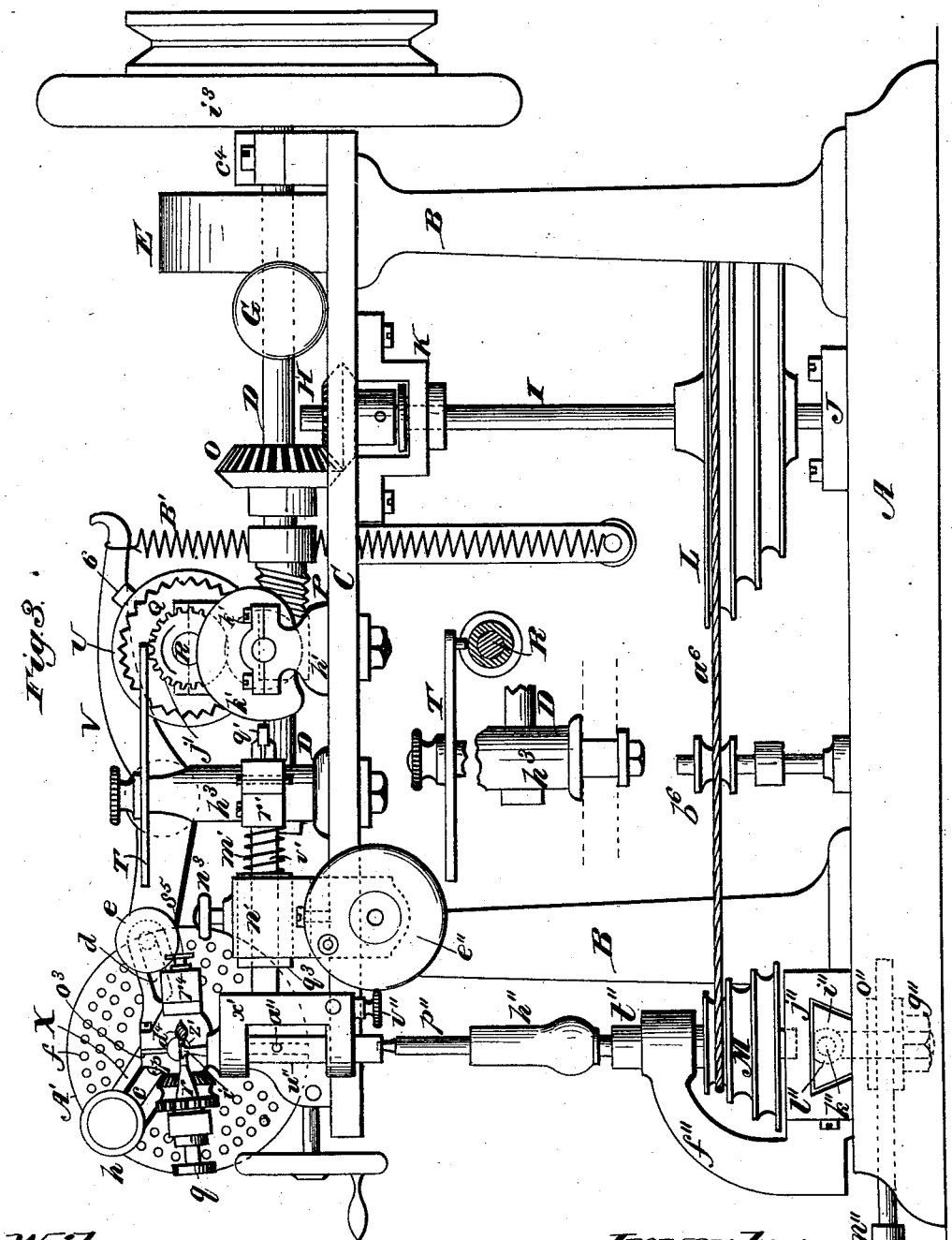
Witnesses.
Robert Emmett
F. Morrison
Inventor:
Louis Maillard,
By W. Bruce
Atty.

(No Model.) 5 Sheets—Sheet 4.
L. MAILLARD.
MACHINE FOR CUTTING DENTAL BURRS.
No. 364,832. Patented June 14, 1887.
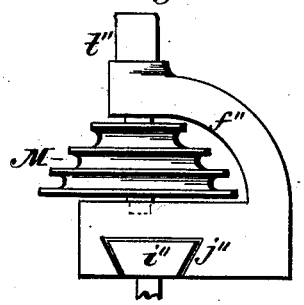
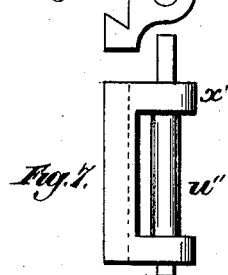
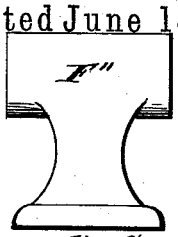
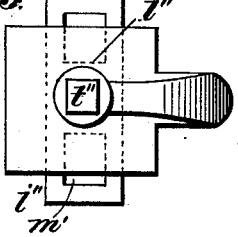
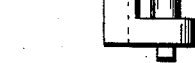
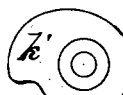
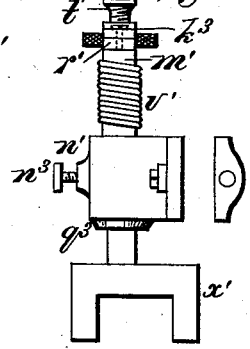
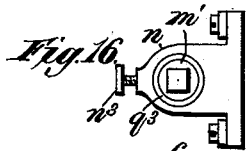
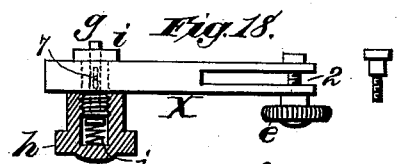
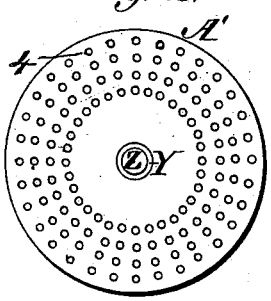
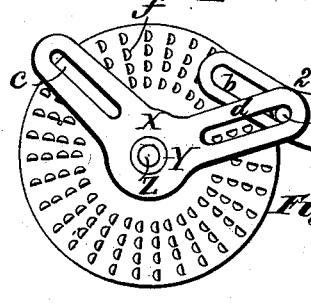
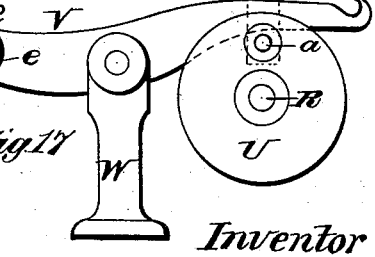
Witnesses:
Robert Everett
J. Morrison
Inventor
Louis Maillard
By W. Bruce
Atty (No Model.) 5 Sheets—Sheet 5.

L. MAILLARD.
MACHINE FOR CUTTING DENTAL BURRS.

No. 364,832. Patented June 14, 1887.

Witnesses.
Robert Everett,
F. Morrison

Inventor
Louis Maillard
By W. Bruce
Atty

United States Patent Office.

LOUIS MAILLARD, OF GALT, ONTARIO, CANADA.

MACHINE FOR CUTTING DENTAL BURRS.

SPECIFICATION forming part of Letters Patent No. 364,832, dated June 14, 1887.

Application filed January 8, 1886. Serial No. 188,025. (No model.) Patented in Canada November 30, 1885, No. 22,913.

*To all whom it may concern:*

Be it known that I, LOUIS MAILLARD, of the town of Galt, in the county of Waterloo, in the Province of Ontario, Dominion of Canada, machinist, have invented a certain new and useful Machine for Cutting Burrs on Dental Instruments; and I do hereby declare that the following is a full, clear, and exact description of the construction and operation of the same.

The invention relates to a very handy and convenient device for cutting burrs on dental instruments more quickly than they can be executed by hand and more exactly.

This invention has for its object to provide novel mechanism for cutting burrs on dental instruments; and to such end the invention consists in the features and combinations of devices hereinafter described and claimed, reference being made to the accompanying drawings, in which—

Figure 1:
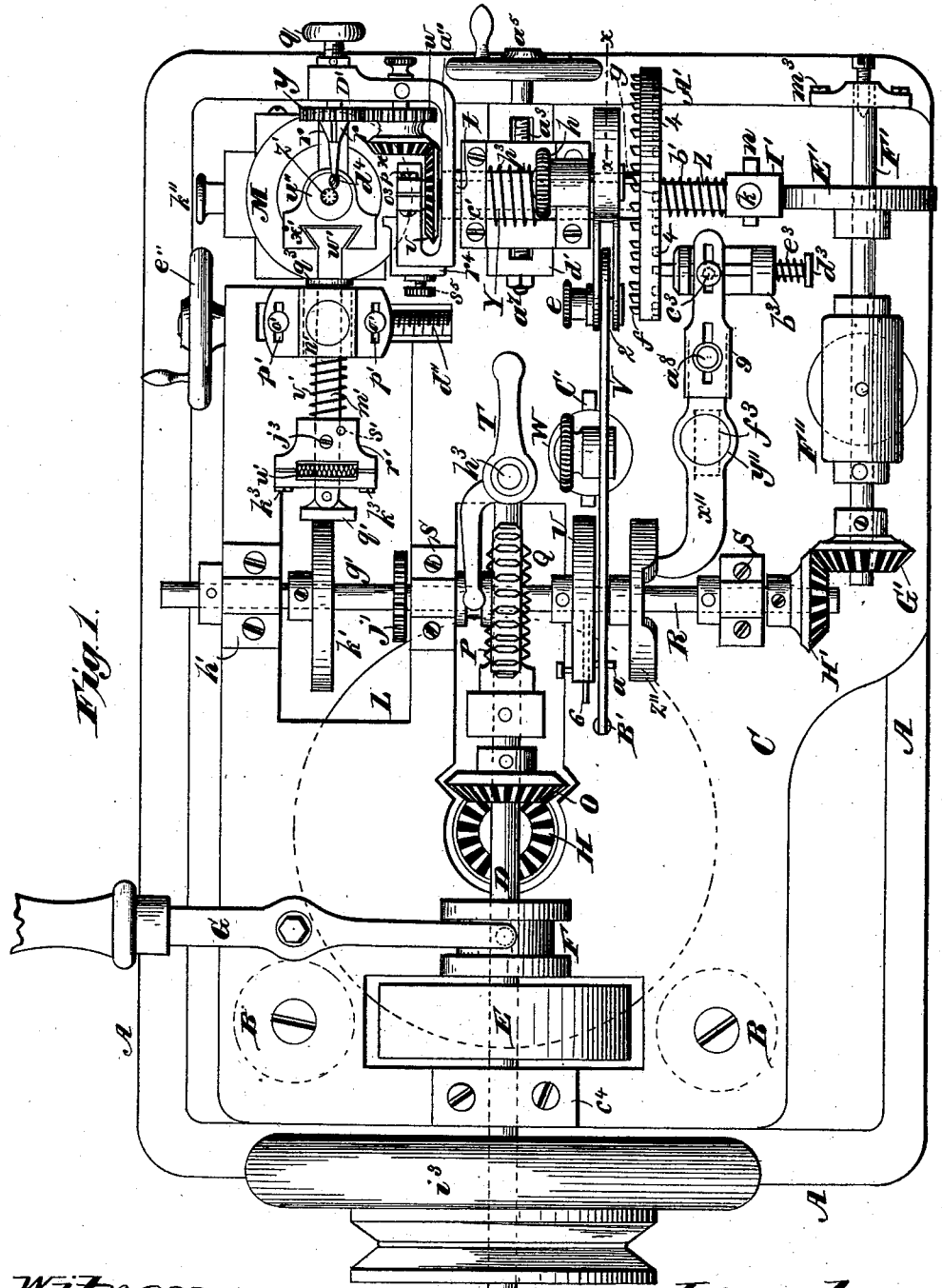
Figure 20:
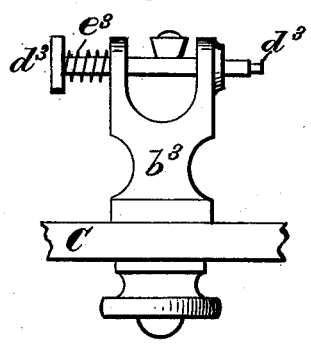
Figure 22:
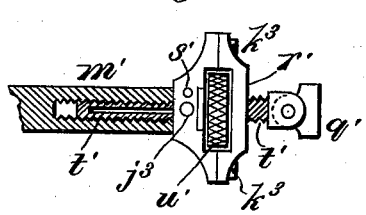
Figure 26:

Figure 1 is a plan view of a machine embodying my invention; Fig. 2, an end elevation of the same; Fig. 3, a side elevation, and Figs. 4 to 26, inclusive, detail views of parts of the mechanism, which are fully explained hereinafter.

In order to enable those skilled in the art to make and use my invention, I will now describe the same in detail, referring to the drawings, wherein—

The letter A indicates a base-frame, from which rise standards B, supporting the horizontal table C. The horizontal main shaft D is supported by a bearing, $c^4$, and a vertical post, $h^3$, bolted to the table, and on said shaft is a key or feather, on which is a clutch, F, operated by a lever, G, to engage and disengage a loose driving-pulley, E, on the main shaft for stopping and starting the operative parts. A bevel-gear, H, is secured to the upper end of a vertical shaft, I, mounted in a step, J, and supported by a bracket, K, secured to the table, and said bevel-gear H engages a bevel-gear, O, on the main shaft D, whereby the shaft I is revolved. The shaft I carries a triple-grooved pulley, L, connected by a belt, $a^6$, with a similar but smaller triple-grooved pulley, M, on an arbor, $t''$, supported by a pulley-holder bracket, $f'''$, fastened to the base by a bolt and nut, $g''$. The belt $a^6$ can be tightened, as required, by any suitable pulley-tightener, as $b^6$. The arbor connects, as hereinafter described, with a cutter, Z'.

A worm, P, on the main shaft D, engages a worm-wheel, Q, on an upper shaft, R, supported in bearings S S and located at right angles to the main shaft, said worm-wheel being adapted to slide on its shaft by means of a lever, T, pivoted to the post $h^3$ and engaging an annular grooved collar secured to one side of the worm-wheel, for causing the latter to engage and disengage the worm. I provide means for causing the burr $d^4$ to push against the cutter Z' and to partially revolve as each cut or groove is formed and for withdrawing the burr from the cutter after each cut, to present a new surface to be acted on by the cutter until the desired cutting or grooving is effected. The means for effecting these purposes I will now explain.

A counter-shaft, F', is supported by bearings F'' and $m^3$ at right angles to the shaft R, and is geared thereto by the bevel-gears G' H', said counter-shaft carrying a cam, E', which operates on the nose-shaped bearing I', connected with a shaft, Z, to advance the latter, and thus advance a chuck-frame, D', mounted on the inner end of the shaft Z, and having chuck-jaws r r, by which the burr $d^4$ is held. A spring, $b'$, retracts the shaft Z after each advancement, and thus the burr is reciprocated adjacent to the cutter Z'. The object of advancing and retracting the shaft Z, as stated, is to move the chuck-frame and the object to be cut horizontally back and forth relatively to the cutter, for effecting the perfect formation of the burr. The bearing I' slides at its lower end on a guide-piece, m, Fig. 2, clamped to the table by a thumb-nut, o. The burr $d^4$ is partially rotated by gear-wheels, as hereinafter explained.

The movements of the burr are governed by the following means: A wheel, U, on the shaft R, is provided with an eccentric-pin, a, fastened to a dovetailed sliding plate, 6, secured by a set-screw in or on said wheel, the pin passing under one end of a lever, V, which is pivoted adjacent to or at its center, so that at every revolution of the wheel the pin a raises one end of the lever to operate a spring-pin, g, as hereinafter explained, which pin engages one of a series of pins, f, on a circular index-disk, A′, which is keyed to a sleeve, Y, which encircles the shaft Z and extends to the rear side, $a^{10}$, of the chuck-frame D′, which connects with a short sleeve, $y^4$, passing through the rear side, and in which side of the chuck-frame the sleeve can rotate. The end of the sleeve in rear of the chuck-frame is provided with longitudinal slots $u\ u$, Fig. 25, for a purpose hereinafter explained. On the sleeve Y is loosely mounted a rocking elbow-lever, X, comprising two arms provided, respectively, with slots $c$ and $d$. The arm of the elbow-lever having the slot $d$ is bifurcated, as at 2, Fig. 18, to receive the end of the lever V, and a bolt, $e$, passing through the slot $d$ of the elbow-lever and the slot $b$ of the lever V, serves to loosely connect these parts. The pin $a$, raising one end of the lever V, causes the spring-pin $g$, which passes through the slot $c$ of the elbow-lever, to engage one of the pins on the index-disk A′, so as to rotate the latter the short distance required. A spring, B′, serves to retract the lever V when the pin $a$ passes from engagement therewith. The pins $f$ are placed on the front side of the disk A′ in annular rows from the center to the circumference, and each one is beveled at its outer end. The pin $g$ is carried by the elbow-lever, as follows: A hollow cap, $h$, is secured to the outer end of one arm of said lever, and connects by screw-threads with a tubular bolt, $i$, in which the pin $g$ can slide, said hollow cap containing a spring, $j$, by which the pin is pressed outward, but can yield inward. The pin may be slotted, as at 7, and be guided by a pin engaging the slot, to keep said pin from turning. These devices rotate the index-disk A′ as far as may be required to turn the spindle Y, for the purpose of rotating the burr $d^4$, which is accomplished as follows: On the shaft Z, directly in front of the rear side, $a^{10}$, of the chuck-frame, is firmly attached a bevel-gear, $v$, on a loose sleeve, $y^4$, having projections $t\ t$, Figs. 1 and 23, which enter the slots $u\ u$ in the end of the sleeve Y, so that the latter, when turned, imparts motion to said bevel-gear $v$, which engages a bevel-gear, $x$, on an adjustable arbor, 10, which passes from the outer side through the chuck-frame and is secured by a set-screw. The gear $x$ carries a pinion, which meshes with a wheel, $w$, which engages with another corresponding pinion, $y$, which surrounds the chuck-jaws $r$, and is secured to a hollow arbor, 11, Fig. 24, that carries said chuck-jaws. Consequently, when the bevel-gear $v$ is turned by the sleeve Y, the chuck-jaws are also rotated, and thereby the burr to be cut is rotated.

It will of course be understood that the disk A′ intermittently rotated, as described, imparts corresponding movements to the sleeve Y, the gearing, and, consequently, the chuck-jaws, so that but a very slight rotation of the object to be cut is effected each time the disk A′ is advanced one step. A spring, $p^3$, may encircle the sleeve Y in the carriage $c′$ to keep said sleeve under tension and prevent its undue rotation. The projections and slot-connection $t\ u$ between the sleeve Y and $y^4$ permit the entire chuck-frame to be reciprocated horizontally by the shaft Z; but the sleeve Y does not partake of such reciprocations, while the sleeve $y^4$ does. The chuck-frame D′ can be adjusted to any desired position or angle around the inner end of the shaft Z, to give the burr to be cut any required oblique position relative to the cutter, by providing the chuck-frame with a slotted outer part, $o^3$, the two parts embracing the shaft Z, and being clamped thereupon by a set-screw, $p$, engaging said slotted parts. (See Figs. 1 and 23.)

Figure 23:
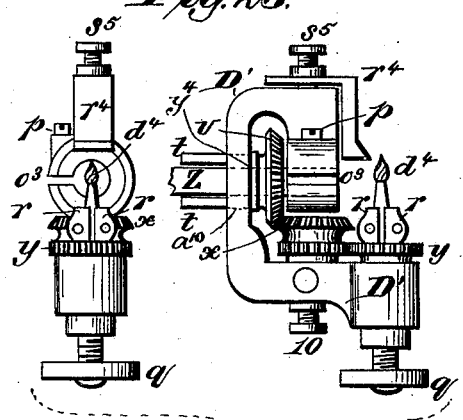
Figure 24:
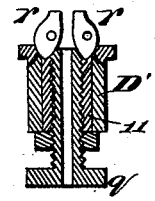

The chuck comprises the following features: the pivoted jaws $r\ r$, Figs. 1 and 23, which hold the instrument or object to be cut, the rear parts of the jaws being beveled and operated on by the conical inner end of a tubular thumb-screw, $q$, to close the jaws on the object. The screw $q$ is hollow to admit of the introduction of the dental instrument or other object to be cut. The shaft Z and spindle Y pass through an adjustable frame or carriage, $c′$, dovetailed to a dovetail plate, $d′$, Figs. 1 and 12, secured to the frame C by two screws or bolts $e′\ e′$. A set-screw, $f′$, Fig. 2, will pass through the lower part of the frame or carriage $c′$ to a gib to adjust the dovetail plate $d′$ to a snug fit to prevent shaking. The dovetail plate $d′$ has a hole in which is inserted a screw-rod, $a^3$, passing through a nut, $a^4$, on the frame or carriage. (Shown by dotted lines, Fig. 2.) The screw-rod is provided with a wheel, $a^5$, by which to turn it, and has a nut, $a^7$, on its inner end, so that the frame or carriage can be nicely moved for laterally adjusting the shaft Z, the sleeve Y, and the chuck-frame D′ to move the burr to be cut to a proper position relatively to the cutter.

I will set forth the means for moving the cutter Z′ along the sides of the object to be cut. A short shaft, $g′$, having a cam, $k′$, is provided with a pinion, $i′$, Fig. 2, engaging a pinion, $j′$, on the shaft R, whereby the shaft $g′$ is revolved and its cam $k′$ caused to operate against devices connected with the cutter-holder, which devices comprise a square bar, $m′$, passing through an adjustable boxing, $n′$, secured to the table C by bolts $o′\ o′$, passing through slots $p′\ p′$. The bar $m′$ is hollow and at one end extends into a wheel-holding frame, $r′$, and is secured thereto by a pin, $s′$. An auxiliary slotted adjusting screw-rod, $t′$, projects from the bar $m′$, being held thereto by a screw, $j^3$, which passes through the frame $r′$ and engages the slot in the screw-rod $t′$. This permits the screw-rod $t′$ to have its wear caused by the cam $k′$ taken up. An adjusting wheel-nut, $u′$, on the screw-rod $t′$, is placed inside the frame $r′$, for the purpose of aiding other devices in adjusting the cutter relatively to the object to be cut, by furnishing convenient means for increasing and diminishing the distance between the cam $k′$ and the cutter. A spring, $v′$, on the shaft $m′$ serves to throw the shoe $q′$ outward against the cam $k′$. To turn the wheel-nut $w'$ the screws $k^3$ of the wheel-holding frame must first be loosened. The outer end of the bar $m'$ is provided with a dovetailed projection, $w'$, fitting a vertical dovetail groove in the cutter-holder $x'$.

The boxing $n'$ is provided with a screw-nut, $c''$, Fig. 2, with which engages a screw-rod, $d''$, having a wheel, $e''$, by which to turn it for laterally adjusting the boxing, and with it the bar $m'$ and cutter-holder $x'$, so that the cutter can be adjusted for regulating the depth of cut. The cutter has, in addition to the horizontal movement imparted by the cam $k'$, a continuously-revolving motion, which is effected as follows: The bracket or pulley holder $f''$ has two horizontal adjustments—that is, back and forth and right and left—to permit the connecting-rod $h''$ to lie in a vertical line with the cutter at all times. A slotted dovetail plate, $i''$, is mounted on the base plate A, and the bottom of the pulley-holder $f''$ is fitted thereto, so that the pulley-holder can slide on said dovetail plate through the medium of a screw-rod, $k''$, engaging the screw-nut $l''$. The side or right and left movements of the pulley-holder are effected by a screw-rod, $n''$, engaging a screw-nut, $o''$. To the upper end of the pulley-holder is secured the aforesaid connecting-rod $h''$, inclosing in its base a suitable spring, and in this rod slides the connecting-rod $p''$, the two rods being loosely connected by a pin and slot, as at $r''$ $s''$, Fig. 2. The rod $p''$ has a squared upper end engaging a corresponding seat in the lower end of the spindle $u''$, which is mounted in the holder $x'$. The lower end of the rod $h''$ has an angular socket fitting the upper end of the arbor $t''$. The constructions set forth permit the connecting-rods to operate the cutter when placed at a slight angle from the perpendicular. The cutter is set in the spindle $u''$, and secured by a set-screw, $a''$, or otherwise. The cutters will be of steel, and of various sizes to suit the conditions required; and in practice the cutter will be adjusted in the spindle $u''$ to its proper position by means of the set-screw $a''$. A screw, $v''$, Fig. 3, may be employed to raise and lower the cutter-holder $x'$, and thereby adjust the cutter vertically to its proper position relative to the axis of the object to be cut.

On the shaft R is a cam-wheel, Z'', to act on one end of a lever, $x''$, pivoted at $y''$, said lever impinging on one side of the cam, which has a taper notch therein into which the end of the lever passes at each revolution of the cam. The lever is in two sections, connected by a thumb-screw, $a^8$, passing through a slot in one section and engaging the other section for lengthening and shortening the lever. The section 9 of the lever is slotted, and connected by a set-screw, $c^3$, with a bearing-post, $b^3$, Figs. 1 and 20, through which bearing-post passes a pin, $d^3$, having its inner end made to engage at intervals the annular series of holes 4 in the rear side of the index-disk A', such holes corresponding in number to the number of pins $f$ on the front side of the disk. The bearing-post $b^3$ is secured to the table C by a thumb-screw beneath the latter. A spring, $e^3$, acts on the pin $d^3$ to disengage it from the index-disk whenever the end of the lever $x''$ enters the notch in the cam Z', to permit the disk to rotate the required distance. The pivot-post $y''$ of the lever $x''$ passes through a slot, $f^3$, in the table C, (see dotted lines, Fig. 1,) and to the end of the pivot-post, beneath the table, is a thumb-nut, $g^3$, Fig. 2, for adjusting the pivot-post in the slot, if desired.

In operating to cut burrs on dental instruments by the chuck and rotary cutter, the shaft Z never revolves, but is held therefrom by the screw $k$; but where small gear, bevel, or spur wheels are to be cut the chuck-frame is removed and the blank for the gear or other wheel is secured to the inner end of the said shaft Z. The screw $k$ is then loosened and the shaft may be revolved by connecting it with the sleeve Y, as by passing a pin through said sleeve and shaft. It will be evident from the foregoing that in operation the cutter not only continuously rotates, but moves horizontally back and forth, and that the burr to be cut is reciprocated horizontally to admit of the cutter moving past its opposite sides; and, further, the chuck is intermittently rotated by the index-disk, sleeve, and gearing in the chuck-frame.

$i^3$ is a fly-wheel at the extreme end of the machine.

Different kinds of burrs or other objects to be cut necessitate various appropriate cams.

Having thus described my invention, what I claim is—

1. The combination, in a machine for cutting burrs, of a revolving and horizontally-reciprocating cutter, with a chuck for holding the object to be cut, and mechanism for reciprocating the chuck horizontally, substantially as described.

2. The combination, in a machine for cutting burrs, of a revolving cutter, with a chuck for holding the object to be cut, and mechanisms for reciprocating and intermittently rotating the chuck, substantially as described.

3. The combination, in a machine for cutting burrs, of a continuously-revolving and horizontally-reciprocating cutter, with a horizontally-reciprocating chuck for holding the object to be cut, substantially as described.

4. The combination, in a machine for cutting burrs, of a revolving and reciprocating burr cutter, with a chuck for holding the object to be cut, means for reciprocating the chuck, and mechanism for imparting a rotating step-by-step motion to the chuck, substantially as described.

5. The combination, in a machine for cutting burrs, of a revolving burr-cutter, with a reciprocating shaft, a chuck-frame mounted on the shaft and reciprocating therewith, a chuck for the chuck-frame, and means for intermittently rotating the chuck, substantially as described.

6. The combination, in a machine for cutting burrs, of a revolving and horizontally-reciprocating burr-cutter, with a reciprocating shaft, a chuck-frame mounted on the shaft and reciprocating therewith, a chuck on the chuck-frame, and mechanism for rotating the chuck, substantially as described.

7. The combination of the reciprocating shaft, the sleeve thereon, the chuck-frame mounted on the shaft, a chuck on the chuck-frame for holding the object to be cut, the index-disk keyed on the sleeve, means for imparting a step-by-step movement to the disk, and devices operated by the sleeve for intermittently rotating the chuck, substantially as described.

8. The combination, with the revolving burr-cutter, of the reciprocating shaft Z, a chuck-frame, D', mounted thereon and reciprocating therewith, the sleeve Y on the shaft, the index-disk A', having pins f and keyed to the sleeve, the elbow-lever X, carrying the spring-pin g and mounted on the sleeve, the lever V, loosely connected with the elbow-lever, and the revolving wheel U, having the eccentric-pin a, substantially as described.

9. The combination, with the revolving burr-shaft, of the reciprocating cutter Z, a chuck-frame, D', mounted thereupon and reciprocating therewith, a chuck on the chuck-frame, the sleeve Y on the shaft, the rotating index-disk A', keyed on the sleeve, means for imparting a step-by-step motion to the disk, and means for intermittently locking the disk in position, substantially as described.

10. The combination, with the revolving cutter, of the reciprocating shaft Z, a chuck-frame, D', moving therewith, a sleeve, Y, on the shaft, the index-disk A', having pins f and holes 4, the pivoted elbow-lever X, carrying the spring-pin g, the pivoted lever V, loosely connected with the elbow-lever, the revolving wheel U, having the eccentric-pin a, the revolving cam Z'', the pivoted lever x''', and the spring-pin d³, substantially as described.

11. The combination, with a reciprocating chuck for holding the burr to be cut, of the cutter-holder, the vertical connecting-rods p'' h'', the adjustable pulley-holder f''', the arbor t'', and means for reciprocating the cutter-holder horizontally, substantially as described.

12. The combination of the reciprocating and laterally-adjustable cutter-holder carrying a cutter with the vertical connecting-rods p'' h'', the adjustable pulley-holder f''', carrying the arbor t'', the pulleys L M, the belt a⁶, the vertical shaft I, the horizontal main shaft D, geared to said vertical shaft, the chuck-carrying shaft Z, mechanism operated by the main shaft to reciprocate the chuck-carrying shaft, and means for rotating the chuck, substantially as described.

13. The combination, with the chuck for holding the object to be cut, of the cutter-holder x', carrying a cutter, the boxing n', the shaft m', extending through the boxing and engaging the cutter-holder, the shoe q', connected with said shaft, the revolving cam k', for acting on the shoe to move the cutter in one direction, and the retracting-spring v', substantially as described.

14. The combination, with the chuck for holding the object to be cut, of the cutter-holder, the revolving cutter, the bar m', connected with the cutter-holder, the screw-rod t', connected with said bar and having the shoe q', the wheel-nut u', the nut-holding frame r', revolving cam k', and retracting-spring v', substantially as described.

15. The combination of the main shaft D, having a worm, P, the shaft R, located at right angles to the main shaft and having a worm-wheel, Q, the counter-shaft F', having the cam E', the reciprocating shaft Z, having the bearing I', the chuck-frame mounted on and moving with the reciprocating shaft, a chuck on the chuck-frame, and means operated from the shaft R to impart a step-by-step rotary motion to the chuck, substantially as described.

16. The combination, with the revolving cutter, of the reciprocating chuck-frame D', having chuck-jaws r to hold the object to be cut, gearing mounted on the chuck-frame, and means for operating said gearing to intermittently rotate the chuck, substantially as described.

17. The combination, with the revolving cutter, of the reciprocating shaft Z, the sleeve Y thereon, the chuck-frame mounted on the shaft, means for imparting a step-by-step rotary motion to the sleeve, and a laterally-adjustable frame or carriage, c', for adjusting the shaft, sleeve, and chuck-frame laterally, substantially as described.

18. The combination, with the revolving cutter, of the reciprocating shaft Z, the sleeve Y thereon, the chuck-frame mounted on the shaft, means for imparting a step-by-step rotary motion to the sleeve, a frame or carriage, c', in which the sleeve and shaft are mounted, and the screw-rod a³, for moving the frame or carriage to adjust the shaft and chuck-frame laterally, substantially as described.

19. The combination, with the revolving and horizontally-reciprocating cutter Z', of the reciprocating shaft Z, the sleeve Y thereon, the chuck-frame mounted on the shaft, a chuck on the chuck-frame, and means for imparting a step-by-step rotary motion to the sleeve and chuck, substantially as described.

Dated at Hamilton, Ontario, this 24th day of March, 1885.

L. MAILLARD.

In presence of—
  W. BRUCE,
  ALICE E. JONES.